United States Patent [19]

Hindermayr et al.

[11] 4,035,747

[45] July 12, 1977

[54] ADJUSTABLE ATTENUATION EQUALIZER

[75] Inventors: Martin Hindermayr, Aying; Georg Koerner, Hohenkirchen, both of Germany

[73] Assignee: Wilhelm Ruf KG, Munich, Germany

[21] Appl. No.: 541,757

[22] Filed: Jan. 17, 1975

[30] Foreign Application Priority Data

Jan. 29, 1974 Germany .......................... 2404079

[51] Int. Cl.² .......................................... H03H 7/16
[52] U.S. Cl. ........................... 333/28 R; 333/70 S; 333/75; 338/129; 338/176
[58] Field of Search ................. 333/28 R, 70 S, 75, 333/81 A, 70 CR; 317/101 A, 101 C

[56] References Cited

U.S. PATENT DOCUMENTS

| | | | |
|---|---|---|---|
| 2,694,184 | 11/1954 | Rounds | 333/28 R |
| 3,471,812 | 10/1969 | Lockner | 333/70 S X |
| 3,624,298 | 11/1971 | Davis et al. | 333/28 R X |

FOREIGN PATENT DOCUMENTS

| | | | |
|---|---|---|---|
| N9,669 | 8/1956 | Germany | 333/28 R |
| 1,131,276 | 6/1962 | Germany | 333/28 R |

OTHER PUBLICATIONS

Divjak, *Operational Attenuation Equalizers*, Elektrotehniski Vestnik, Ljubljana, 37 (1970), pp. 185–191 cited.

*Primary Examiner*—Paul L. Gensler
*Attorney, Agent, or Firm*—Burgess, Dinklage & Sprung

[57] ABSTRACT

Attenuation equalizer in the circuit of an adjustable four-terminal network for correcting the frequency-related attenuation curve of cables including a bridged T circuit containing ohmic resistances and having two fixed ohmic series resistance, preferably of equal resistance value, bridged by a bridging impedance, the bridging impedance being a series-resonant circuit having an inductance, a condenser and a variable parallel resistance wherein the shunt impedance is a parallel-resonant circuit having an inductance, a condenser and a variable series resistance, the latter being adjustable by means of a common traversing device. The resistance elements of the fixed resistances and the variable resistances, the inductances, the condensers and the conductors are mounted on a single support of insulating material, and the plates, layers or the coatings of the condensers are disposed parallel and in lateral spaced relationship to the corresponding variable resistances of the bridging and shunt impedance such that they serve simultaneously as wiper tracks for the common traversing device of the variable resistances.

22 Claims, 11 Drawing Figures

ADJUSTABLE ATTENUATION EQUALIZER

BACKGROUND

The invention relates to an adjustable attenuation equalizer in the circuit of a four-terminal network for the correction of the frequency-related attenuation characteristic of cables, said equalizer being composed of a bridged T circuit containing ohmic resistances and having two ohmic series resistances, preferably of the same resistance value, bridged by a bridging impedance. The bridging impedance consists of a series-resonant circuit containing an inductance, a condenser and a variable resistance in parallel, while the shunt impedance is formed of a parallel-resonant circuit containing an inductance, a condenser, and a variable series resistance. Both variable resistances are adjusted by a common mechanical traversing means.

The starting point of this invention is Australian Patent Application A 9530/73, in which the problem of finding an equalizer which will equalize the attenuation curve of transmission lines and circuits by means of a simple-to-operate circuit having optimum input and output matching was solved by purely electrical means. The present invention provides a structural component by which the equalization of the attenuation, especially in the case of relatively long conductors, and particularly in broad-band cable connections for telephone installations, cable television, community antenna installations or the like, will be accomplished in accordance with the known electrical circuit, taking into account especially the peculiarities of the ultra-high frequency range up to approximately 900 MHz.

SUMMARY

In accordance with the invention the problem is solved by the fact that the resistance elements of the fixed and variable resistances, the inductances, the condensers, and the corresponding connecting conductors are mounted on a single support made of insulating material, the condenser plates and coatings or the like being arranged in parallel spaced relationship with the corresponding elements of the variable resistances of the bridging impedance and the shunting impedance such that they serve simultaneously as slide tracks for the wiper springs of the variable resistances which are conjointly displaceable, or "ganged," by means of a common wiper spring holder. The use of a single support for the mounting of resistors, coils, condensers and conductors presents both technical and economical advantages. By the arrangement of the condenser plates in relation with the resistance elements of the variable resistances in accordance with the invention, it is possible to dispense with separate slide tracks for the wiper springs of the resistors, since they are already constituted by the condenser plates. This also helps to reduce the size of the support, thereby reducing the bulk of the entire assembly. In the same manner, the single support eliminates the need for additional electrical components which would have a negative effect on the overall construction of the equalizer. The overall performance of the equalizer is better due to the elimination of additional slide tracks and separate conductors, because the negative influences of capacity and inductance which are encountered especially in the ultra-high frequency range are thus avoided.

DESCRIPTION OF THE DRAWING

The present invention will be more fully understood from the following description taken in conjunction with the accompanying drawing wherein.

DESCRIPTION

Figure 1:
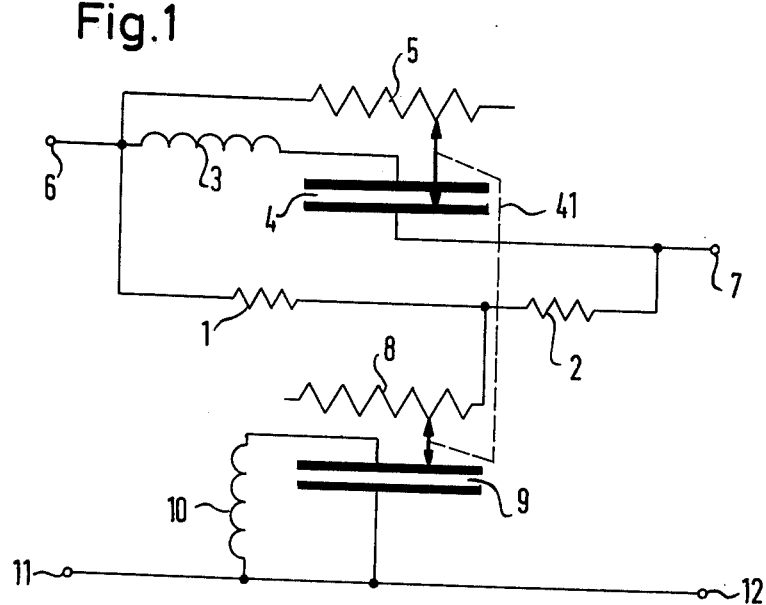
FIG. 1 is a schematic diagram of the attenuation equalizer of the invention.

In a special development of the invention, the condensers can be in the form of plate condensers having plates in a congruent relationship on both sides of the support. This makes it possible for the condensers to be relatively small. Furthermore, no contacts passing through the support are necessary, and less stray capacity occurs than is the case, for example, with the additional possibility, in accordance with the invention, of using adjacent plates of surface condensers or intermeshing plates in the case of multiple-plate condensers in order to increase the capacity. On the other hand, in these surface condensers and multiple-plate condensers formed of condenser plates applied to one side of the support, there exists the advantage that the support needs to be coated only on one side. The same applies substantially to compression condensers in which the stacked condenser plates are also mounted on only one side of the support. It is necessary in this case, of course, that a dielectric be inserted between the condenser plates, this purpose being served by the support itself in the case of the plate condensers. In accordance with the invention, plate condensers can be combined on the support with surface and/or compression and/or multiple-plate condensers.

In order to simplify the ganging of the variable resistances, the characteristics of the resistance elements of the variable resistances disposed in series on the support are of opposite orientation. This also fulfills the electrical requirement that the product of the resistance values in circuit in the variable parallel and series resistors be constant regardless of the position of the moving contacts. The use of identical characteristics, which is also possible, results in a complex and expensive moving contact drive, because then it is necessary at least to operate the spring wipers in opposite directions in order to meet the requirement that the resistance values in circuit have a constant product regardless of the position of the moving contacts. In this case, however, the mounting of the resistance elements is simpler since no special care is required with regard to opposition of resistance values.

The variable resistances can both be linear whether their characteristics be opposite or identical. However, they can also both be logarithmic, and for this purpose there exists the third possibility that the one variable resistance is linear and the other variable resistance is logarithmic.

Furthermore, in an advantageous arrangement in accordance with the invention the resistances, condensers and inductances can be symmetrical such that the distance of the one outer longitudinal edge of the support from the condenser plate of the series-resonant circuit is equal to the distance of the opposite outer longitudinal edge of the support from the inductance element of the series-resonant circuit. The variable parallel resistance of the bridge impedance is located centrally between the condenser plate and the inductance element. The distances to the outer longitudinal edges of the support and hence to the shielding are preferably made great. By this construction the effects especially of stray capacity are kept small. The condenser of the series-resonant circuit can, in the plate condenser type of construction, have one condenser on the upper side of the support with the resistance element of the variable parallel resistance disposed parallel thereto, and a second condenser plate on the lower side of the support, congruent with the profile of the first, and having an adjoining inductance element. The resistance element is located centrally between the condenser plates and the inductance element on the upper side of the support, and is electrically connected to the latter by a solder pin, rivet or the like serving as an input or output terminal. In this manner particularly short conductance paths are achieved, which is advantageous in production and has a desirable effect on the overall performance of the equalizer at high frequencies as high as 900 MHz.

In a further development, the condenser plates can be disposed end to end on the upper side of the support, and the corresponding elements of the variable resistances can be mounted parallel and in lateral spaced relationship to the condenser plates and also end to end. The elements of the fixed resistances in this case are in series between the adjacent ends of the condenser plates on the support. In addition, the condenser plates can lie side by side on the top side of the support, the parallel extending resistance elements of the variable resistances being disposed between them.

Another advantageous embodiment of the invention provides that the condenser plates be disposed on the upper side of the support offset from one another such that the condenser plate of the series-resonant circuit and the resistance element of the variable series resistance of the shunt impedance are disposed end to end, and the condenser plate of the parallel-resonant circuit and the resistance element of the variable parallel resistance of the bridging impedance also are arranged end to end. The elements of the variable resistances are in each case disposed equidistant from and parallel to the condenser plates. Between the facing ends of the condenser plates and of the elements of the variable resistances are located the elements of the fixed resistances between which the element of the variable series resistance of the shunt impedance is connected. By this arrangement especially short conduction paths are achieved, thereby largely avoiding negative influences of a capacitive and inductive nature. Furthermore, the amount of space required by the circuit as a whole will be small.

The condenser plates or coatings, inductance elements and conductors can be applied to a support that is copper coated on one or both sides, in the manner of a printed circuit. They can also be applied to an insulator, such as a ceramic support, for example, by the thick film technique.

The support can be inserted as a base plate in a fully enclosed housing containing the entire component, in which a common wiper spring holder carrying the wiper springs of the variable resistances of the shunt impedance and bridging impedance cooperates for longitudinal displacement with a threaded spindle rotatably mounted in the housing. The wiper spring holder has a channel-like cross section on one side, with a crossbar provided therein for the guidance and engagement of the wiper spring holder in the threads of the threaded spindle.

In an advantageous further development, the wiper spring holder can have, on the side facing away from the channel-like cross section, two transversely disposed bridges arranged at the ends and provided with apertures emerging from the interior, and it may be provided with a third bridge centrally between the two end bridges, the third bridge having apertures on both sides, so that the spring wipers can be inserted as desired into the apertures of the end bridges and/or those of the middle bridge.

The wiper spring holder can have another crossbar, in addition to the crossbar in the channel-like cross section, on each side of the sides of the channel. This provides a three-point support for the wiper spring holder without bringing it in contact with the support. This construction avoids the bumpy crossing of rivets or solder pins. Moreover, the wiper holder thus offers a choice of four different arrangements of the wiper springs.

The schematic diagram of the adjustable attenuation equalizer in the form of a four-terminal network for the correction of the frequency-vs.-attenuation characteristic of cables is shown in FIG. 1. It consists of the bridged T circuit having two series resistances 1 and 2 of the same resistance value, the bridge impedance consisting of a series-resonant circuit with an inductance 3, a condenser 4 and the variable parallel resistance 5. It is evident from the schematic diagram that the variable parallel resistance 5, the inductance 3 and one series resistance 1 are connected in common to the input terminal 6. At the same time, the variable parallel resistance 5 is disposed parallel to the condenser 4 which is connected, in common with the second series resistance 2, to the output terminal 7 of the series-resonant circuit.

Between the two series resistances 1 and 2 there is connected the shunt impedance consisting of a parallel-resonant circuit with a condenser 9, an inductance 10 and a variable series resistance 8. Here again the variable resistance 8 is disposed parallel to the condenser 9. The resistances, which are variable by means of a common traversing means, cooperate with wiper springs adjustable in synchronism, the condenser plates disposed parallel thereto in each case serving simultaneously as the slide tracks. By this method the capacitive and inductive side effects are kept as low as possible. The condenser 9 and the inductance 10 of the parallel-resonant circuit are connected through conductors to the second input terminal 11 and to the second output terminal 12, respectively, of the four-terminal network.

Figure 2:
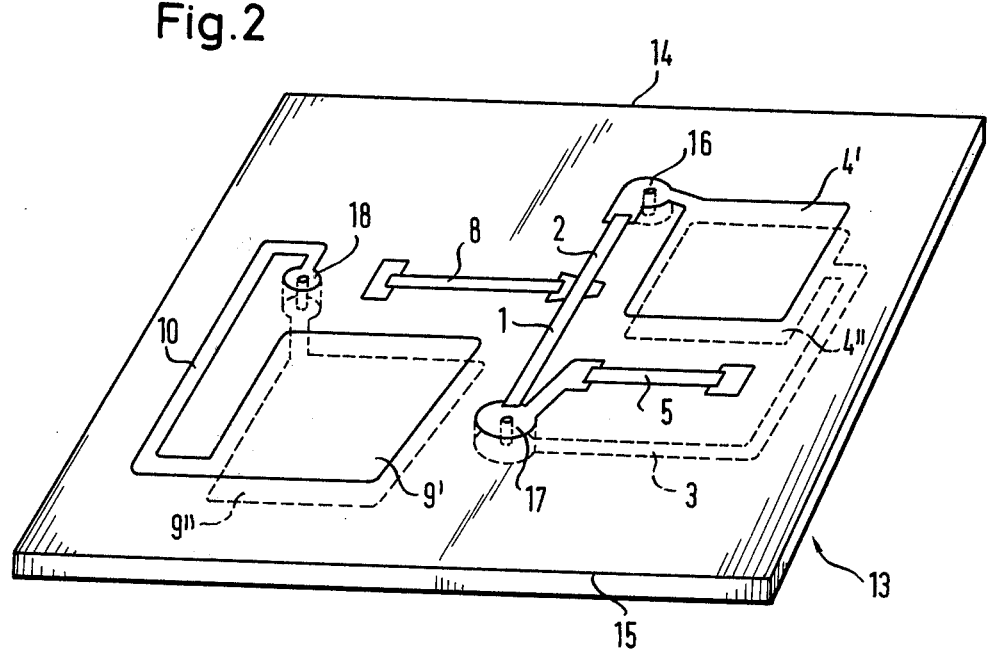
FIG. 2 is a perspective view, partially in phantom, of the mounted condensers, inductances, resistances and conductors.

In FIG. 2 the above-described circuit is represented assembled on a support 13 of insulating material. The condensers 4 and 9 as well as the variable resistors 5 and 8 are in reversed arrangement with respect to one another. Thus, one condenser plate 4' of condenser 4, which is in the form of a plate condenser, is located on the upper side of the support 13. In parallel spaced relationship to the condenser plate 4', the resistance element of the variable parallel resistance 5 is applied centrally between the condenser plate 4' on the upper side of the support and the inductance element 3 disposed on the underside of the support 13. The inductance element 3 is connected to the condenser plate 4" which is applied to the underside of the support so as to coincide with condenser plate 4'. The relatively great distances between the outer edge 14 of the support 13 and the condenser plates 4' and 4" and between the outer edge 15 and the inductance element 3 are approximately equal. Approximately diagonally opposite the location of condenser plates 4' and 4", and in the prolongation of the resistance element of variable resistance 5 there is mounted the condenser 9 with condenser plates 9' and 9" coincidently applied to the top side and bottom side, respectively, of support 13. Again, the resistance element of the variable resistance 8 is on the upper side of the support and in parallel spaced relationship with the condenser plate 9". An inductance element 10 is connected to the condenser plate 9'. Between the opposing edges of the condenser plates 4' and 9' and between the opposing ends of the elements of resistances 5 and 8 there are located in series the fixed resistances 1 and 2 having the same resistance value. The resistance element of the variable resistance 8 of the shunt impedance is connected in the form of a node point between them. The connection of the fixed resistances 1 and 2 to the condenser 4 and to the variable resistances 5 and 8 and inductance 3 is accomplished by means of soldering pins 16, 17 and 18 to which the input terminals 6 and 11 and the output terminals 7 and 12 are connected. The characteristics of the resistance elements of the variable resistances 5 and 8 are opposite, in order thus to achieve a simple means of controlling them. The conduction paths in this described embodiment are especially short, thereby largely avoiding undesired secondary influences. In addition, the elements of the inductances 3 and 10 are not brought too close to the potentials, because the distributed capacity of the strip conductor greatly compensates the inductance.

Figure 3:
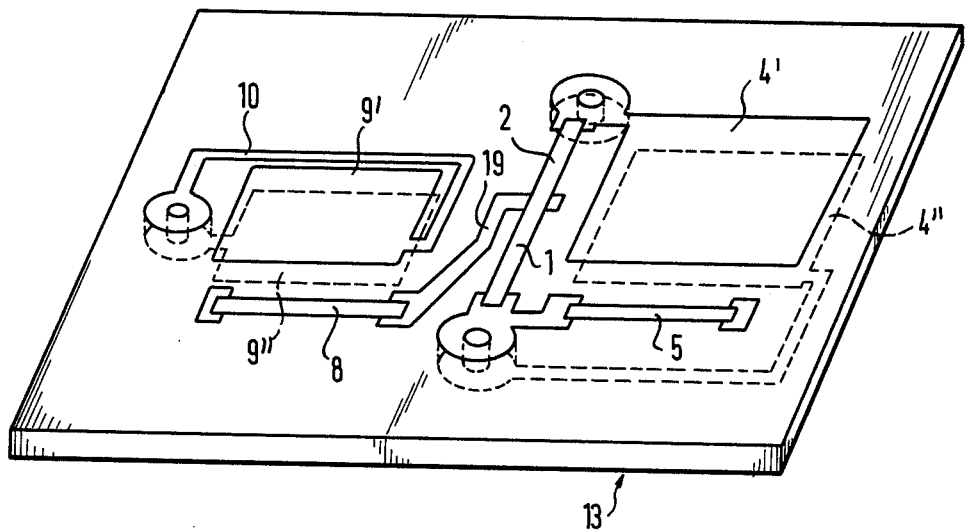
FIG. 3 is a perspective view, partially in phantom, of another arrangement of the condensers, inductances, resistances and conductors.
Figure 4:
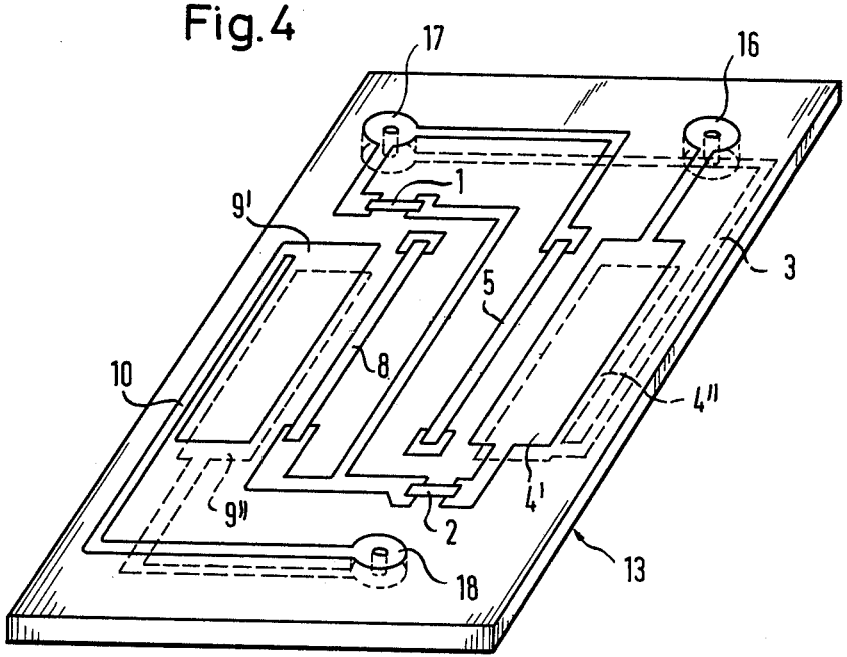
FIG. 4 is a perspective view, partially in phantom, of another arrangement of the condensers, inductances, resistances and conductors.

FIG. 3 represents a construction similar to that of FIG. 2. The difference is that, in FIG. 3, in contrast to FIG. 2, the condensers 4 and 9, with their plates 4', 4" and 9', 9", applied in congruity with one another on opposite faces of support 13, are disposed end to end. The fixed resistors 1 and 2 are in series between the end edges of the condensers, while the resistance elements of the variable resistances 5 and 8 are mounted end to end on the long sides of the condenser plates 4' and 9' and parallel therewith. In FIG. 4 the condenser plate 4' is disposed alongside the condenser plate 9'. The resistance elements of the variable resistances 5 and 8 are here located between the condenser plates 4' and 9' and in parallel spaced relationship therewith.

Figure 5:
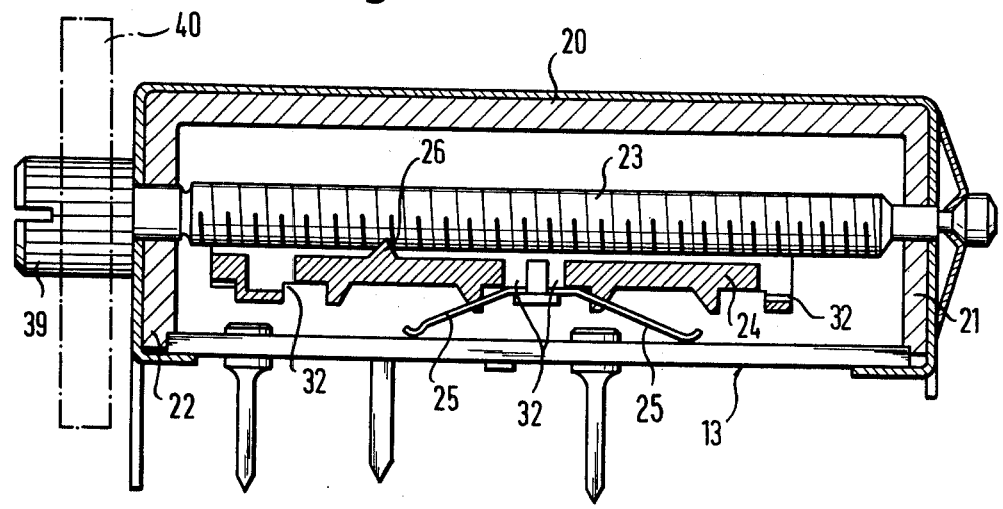
FIG. 5 is a cross-sectional representation of the attenuation equalizer.
Figure 6:
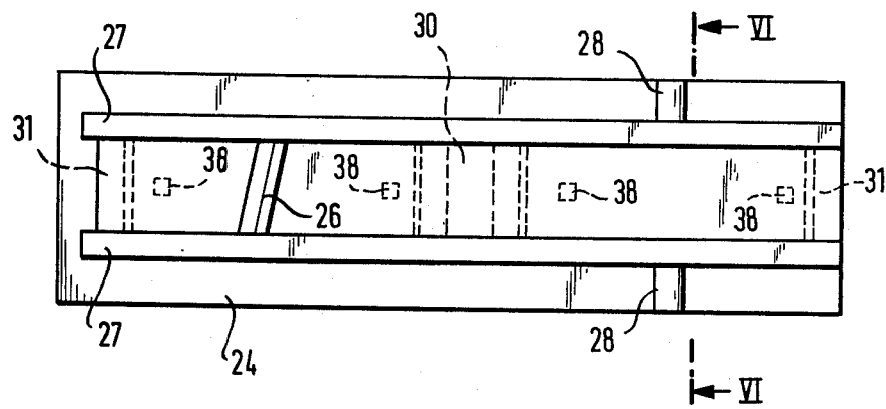
FIG. 6 is a top plan view of the channel-like spring holder of the attenuation equalizer.
Figure 7:
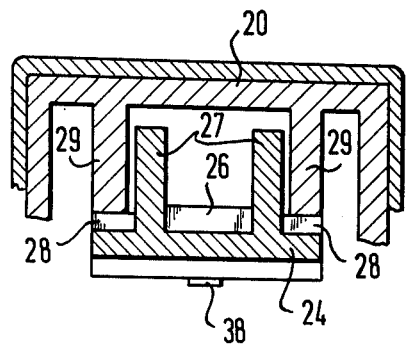
FIG. 7 is a cross-sectional view through the spring holder taken along line VI—VI in FIG. 6.

The general construction of the attenuation equalizer is shown in FIG. 5. Support 13, with the condenser plates, resistance elements, inductance elements and conductors applied in the manner of a printed circuit or by the thick film technique, forms the base plate for a fully closed housing 20 which is mounted thereon. The top side of the support 13 is on the interior of the housing. A threaded spindle 23 is mounted rotatably but lengthwise immovably in the end walls 21 and 22 of housing 20 above the support 13. The threaded spindle 23 is provided with a continuous thread, this being possible on account of the opposed characteristics of the resistance elements of the variable resistances 5 and 8. Above the support 13 there is a wiper holder 24 which cooperates with the threaded spindle 23 for longitudinal displacement, but is secured against rotation. For this purpose the wiper holder 24 is provided with a channel-like cross section extending around the threaded spindle 23, thus assuring straight guidance. It is additionally provided with a crossbar 26 disposed adjacent one end wall, which engages the screw threads of the spindle 23 thus permitting a play-free longitudinal displacement. Into the wiper holder 24 there are fixedly inserted, on the side facing support 13, two electrically separated spring wipers 25 which with their two wiper contacts travel synchronously over the elements of the variable resistances 5 and 8 and simultaneously over the parallelly disposed condenser plates 4' and 9'. The wiper holder 24 is urged against the threaded spindle 23 by the spring wipers 25. In addition to the crossbar 26, it is guided in the manner of a three-point bearing by a second and third crossbar 28 at the other end of the wiper holder 24, one on each side, externally of the channel formed by the upright portions 27. These crossbars 28 rest against dependent portions 29 of the housing 20. The upright portions 27 of the channel-like cross section and the crossbars 26 and 28 can best be seen in FIGS. 6 and 7. FIG. 7 additionally shows the construction of the dependent portions 29 of housing 20 of the attenuation equalizer and how the crossbars 28 rest upon the dependent portions 29.

The spring holder 24 is furthermore provided with a total of three bridge members 30 and 31 extending crosswise over the side of the spring holder facing the support 13. Two of these bridge members 31 are located at the extremities of the spring holder 24, while the third bridge member 30 is disposed in the middle between these two end bridge members. The bridge members 30 and 31 all have apertures 32 for the accommodation of the spring wipers 25 which are held together therein by means of projections 38 disposed in the middle of the spring holder 24. The spring wipers 25 can be relocated as desired on the basis of the total of four apertures 32.

Figure 8:
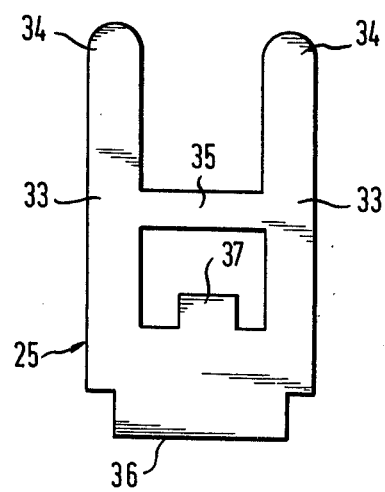
FIG. 8 is a top plan view of a wiper spring.

As seen in FIG. 8, the spring wipers 25 consist essentially of two parallel wiper arms 33 with wiper contacts 34. The wiper arms 33 are joined together by a cross member 35 to keep the electrical conduction paths short. The narrowed end 36 of the spring wiper 25 is inserted into the apertures 32 at the bridge members 30 and 31 of the spring holder 24, while a lug 37 on the cross member 35 snaps into place against the projections 38 on the spring holder 24.

Figure 9:
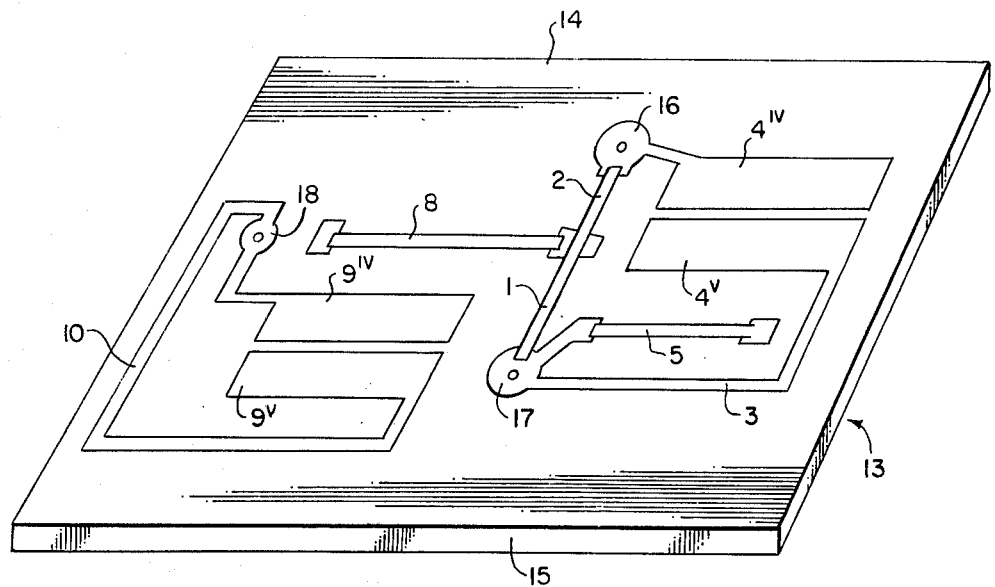
FIG. 9 is a view similar to FIG. 3 showing surface condensers $4'^V$, $4^V$, $9^V$ and $9'^V$ which are all arranged at one side of the support plate 13 in parallel.
Figure 10:
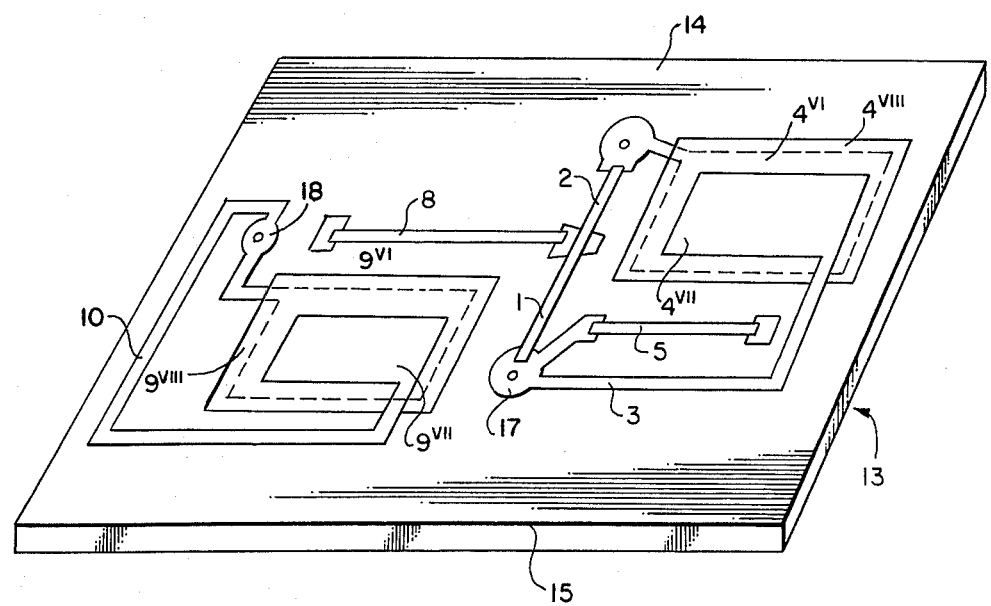
FIG. 10 is a view similar to FIG. 9 showing compression condensers $4^{VI}$, $4^{VII}$, $4^{VIII}$, $9^{VI}$, $9^{VII}$ and $9^{VIII}$ with the dielectric interposed in each instance. The condenser surfaces are arranged one over the other on one side of the support plate 13.
Figure 11:
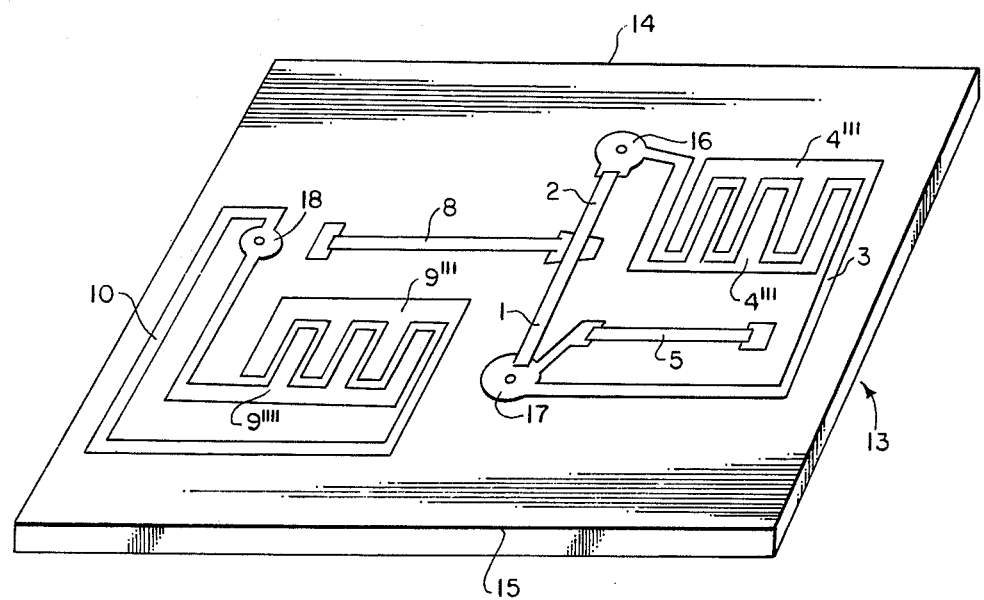
FIG. 11 is a view similar to FIGS. 9 and 10 showing condenser plates $4'''$, $4''''$, $9'''$ and $9''''$.

FIGS. 9, 10 and 11 show various condensers disposed in respect of the support plate 13. FIG. 9 concerns surface condensers $4'^V$, $4^V$, $9^V$ and $9'^V$ which are all arranged on one side of the support plate 13 in parallel. FIG. 10, on the other hand, relates to compression condensers $4^{VI}$, $4^{VII}$, $4^{VIII}$, $9^{VI}$, $9^{VII}$ and $9^{VIII}$ with the dielectric interposed in each instance. The condenser surfaces are arranged one over the other on one side of the support plate 13. This embodiment represents a compression condenser in thick film technique and belongs to the series of the plate condensers.

For the operation of the threaded spindle, a turnbutton 39 affixed to spindle 23 is provided on the exterior of the housing 20. As indicated in FIG. 5 by the broken lines, a knurled knob 40 may be used instead of the button 39 if necessary for space-saving reasons or on account of the peculiar location in which the equalizer is mounted. The knurled knob 40 can be fastened directly to the threaded spindle 23 or externally on the turnbutton 39.

All details represented in the drawings and explained in the description are important to the invention.

What is claimed is:

1. Attenuation equalization in the circuit of an adjustable four-terminal network for correcting the frequency-related attenuation curve of cables comprising a bridged T circuit containing ohmic resistances and having two fixed ohmic resistors in series with one another, bridged by a bridging impedance, the bridging impedance provided by a series-resonant circuit having an inductance, a condenser and a first variable parallel resistor having a resistive track, said attenuation equalizer having a shunt impedance transverse to said bridging impedance formed of a parallel-resonant circuit parallel thereto having an inductance and a condenser in series with a second variable resistor having a resistive track, said variable resistors being traversed by a common traversing means, said fixed resistors, said variable resistors, said inductances, said condensers being mounted on a single support of insulating material, and the plates of the condensers are disposed parallel and in lateral spaced relationship to the corresponding variable resistors of the bridging impedance and shunt impedance such that they serve simultaneously as wiper tracks for the common traversing means of the variable resistors.

2. Attenuation equalizer of claim 1 wherein the condensers are plate condensers having condenser plates arranged congruently on both sides of the support.

3. Attenuation equalizer of claim 1 wherein the electrical characteristic of the resistive track of the variable resistor of the bridging impedance runs in the opposite direction to the electrical characteristic of the resistive track of the variable resistor of the shunt impedance.

4. Attenuation equalizer of claim 1 wherein the electrical characteristic of the resistive track of the variable resistors of the shunt impedance and bridging impedance are the same.

5. Attenuation equalizer of claim 1 wherein the variable resistors are linear.

6. Attenuation equalizer of claim 1 wherein said single support has a pair of opposed outer longitudinal edges and the distance from one outer longitudinal edge of said support to the condenser plate of the series-resonant circuit is equal to the distance from the opposite outer longitudinal edge of said support to the inductance element of the series-resonant circuit, and the variable parallel resistor of the bridging impedance is located centrally between the condenser plate and the inductance element.

7. Attenuation equalizer of claim 1 wherein the condenser of the series-resonant circuit is a plate condenser and a condenser plate thereof is disposed on the upper side of said support with the resistance element of the variable parallel resistance disposed parallel thereto, and the second condenser plate is disposed on the underside with connected inductance element, the resistance element of the variable parallel resistance being located centrally between said condenser plates and the inductance element and being electrically connected to the latter.

8. Attenuation equalizer of claim 1 wherein the condenser plates on the upper side of said support are disposed side by side and the corresponding elements of the variable resistances lying parallel and in lateral spaced relationship thereto are mounted between the condenser plates.

9. Attenuation equalizer of claim 1 wherein the condenser plates and inductance elements in the form of a printed circuit board which is copper clad on at least one side.

10. Attenuation equalizer of claim 1 wherein the condenser plates and inductance elements are connected to an insulator via a thick-film.

11. Attenuation equalizer of claim 1 wherein said support is used as the base plate of a fully enclosed housing and a common holder means for the common traversing means having wiper springs of the variable resistances of the bridging impedance and of the shunt impedance cooperates for longitudinal displacement with threaded spindle means rotatably carried in the housing.

12. Attenuation equalizer of claim 11 wherein the threaded spindle means is provided with an actuating knob outside of the housing.

13. Attenuation equalizer according to claim 12 wherein the actuating knob comprises a knurled knob.

14. Attenuation equalizer of claim 1 wherein the condensers are surface condensers having condenser plates disposed adjacent one another on one side of the support.

15. Attenuation equalizer of claim 1 wherein the condensers are compression condensers having condenser plates disposed one over the other on one side of said support with interposed dielectric.

16. Attenuation equalizer of claim 1 wherein the condensers are multiple-plate condensers having condenser plates intermeshing comb-wise on one side of said support.

17. Attenuation equalizer of claim 1 wherein the variable resistors are logarithmic.

18. Attenuation equalizer of claim 1 wherein the condenser plates on the upper side of said support are disposed side-by-side and the corresponding elements of the variable resistors lying parallel and in lateral spaced relationship thereto are mounted along side the condenser plates.

19. Attenuation equalizer according to claim 1 having a wiper spring holder, said holder having a cross section which is channel-like on one side, and a crossbar located therein with an engagement and guidance of spring holder means and the threads of a threaded spindle rotatably mounted in a housing, said spring holder means having two transversely disposed bridges on the side facing away from the channel-like cross-section provided one at each end and having apertures emerging from the inside, said holder being provided with a third bridge disposed centrally between the end bridges and having apertures on both sides so that wiper springs are insertable selectively into the apertures of the end bridges.

20. Attenuation equalizer according to claim 19 wherein the spring holder has, in addition to the cross-bar located adjacent one end of the channel-like cross-section, in the manner of a three-point bearing, an additional cross-bar on each side outside the sides of the channel-like cross-section said cross-bar lying upon the longitudinal sides of said housing which straddle the channel-like portion of the string holder.

21. Attenuation equalizer according to claim 1 having a wiper spring holder said holder having a cross section which is channel-like on one side, and a cross-bar located therein with an engagement and guidance of spring holder means and the threads of a threaded spindle rotatably mounted in a housing, said spring holder means having two transversely disposed bridges on the side facing away from the channel-like cross-section provided one at each end and having apertures emerging from the inside, said holder being provided with a third bridge disposed centrally between the end bridges and having apertures on both sides so that wiper springs are insertable selectively into said middle bridge.

22. Attenuation equalizer according to claim 1 wherein the condenser plates of the series resonant circuit are offset from the condenser plates of the parallel resonant circuit, the variable resistor of the shunt impedance is aligned linearly with the condenser plates of the series resonant circuit and transversely with the condenser plates of the parallel resonant circuit, the variable resistor of the series resonant circuit is aligned linearly with the condenser plates of the parallel resonant circuit and transversely with the condenser plates of the series resonant circuit, said fixed resistors being disposed end-to-end transversely between the the condenser plates of the series resonant circuit and the condenser plates of the parallel resonant circuit and having connected therebetween the variable resistors of the shunt impedance, the elements of the variable resistors lying in each case at the same parallel distances from the condenser plates of their respective circuit, said fixed resistors being disposed between the facing end edges of the condenser plates, all of said elements being disposed on the upper side of said support.

* * * * *